(12) United States Patent
Ko et al.

(10) Patent No.: US 9,494,130 B2
(45) Date of Patent: Nov. 15, 2016

(54) YAW CONTROL-BY-RUDDER TYPE TIDAL STREAM POWER GENERATION APPARATUS AND YAW CONTROL METHOD OF THE SAME

(71) Applicant: KOREA INSTITUTE OF OCEAN SCIENCE & TECHNOLOGY, Ansan-si (KR)

(72) Inventors: Jin Hwan Ko, Seoul (KR); Kwang-Soo Lee, Seoul (KR); Ji Hoon Kim, Ansan-si (KR); Tae Gyu Hwang, Busan (KR); Jin Hun Choo, Busan (KR); Jong Su Yoon, Busan (KR)

(73) Assignee: KOREA INSTITUTE OF OCEAN SCIENCE & TECHNOLOGY (KR)

( * ) Notice: Subject to any disclaimer, the term of this patent is extended or adjusted under 35 U.S.C. 154(b) by 0 days.

(21) Appl. No.: 14/635,214

(22) Filed: Mar. 2, 2015

(65) Prior Publication Data
US 2015/0285213 A1 Oct. 8, 2015

(30) Foreign Application Priority Data
Apr. 8, 2014 (KR) ........................ 10-2014-0041840

(51) Int. Cl.
| | | |
|---|---|---|
| *F03B 13/10* | (2006.01) | |
| *F03B 13/12* | (2006.01) | |
| *H02P 9/04* | (2006.01) | |
| *F03B 13/26* | (2006.01) | |

(Continued)

(52) U.S. Cl.
CPC ............. *F03B 13/264* (2013.01); *F03B 15/00* (2013.01); *Y02E 10/28* (2013.01)

(58) Field of Classification Search
USPC ................................................ 290/42, 45, 54
See application file for complete search history.

(56) References Cited

U.S. PATENT DOCUMENTS 4,089,492 A * 5/1978 Lang ........................ B64B 1/005
244/30
4,905,932 A * 3/1990 Piasecki .................. B64C 27/82
244/17.19

(Continued)

FOREIGN PATENT DOCUMENTS

| KR | 1020080087433 | 10/2008 |
|---|---|---|
| KR | 1020110075310 | 7/2011 |

(Continued)

*Primary Examiner* — Pedro J Cuevas
(74) *Attorney, Agent, or Firm* — Cantor Colburn LLP

(57) ABSTRACT

A yaw control-by-rudder type tidal stream power generation apparatus includes: a nacelle used in a tidal stream power generator that converts flowing energy of a tidal stream to generate electric power, and located in the tidal stream to be rotatable about a first rotating shaft; a rotor provided at one side of the nacelle with reference to the first rotating shaft, and configured to be rotated by the flowing energy of the tidal stream; a rudder unit provided at the other side of the nacelle with reference to the first rotating shaft, and including a rudder fixed to the nacelle and a variable rudder rotatably connected to the nacelle; and a control unit configured to control the rotation of the variable rudder. When the flow direction of the tidal stream is changed, the rotation of the variable rudder is controlled by the control unit.

8 Claims, 8 Drawing Sheets

(51) Int. Cl.
*F03B 15/00* (2006.01)
*F03B 13/00* (2006.01)

(56) References Cited

U.S. PATENT DOCUMENTS

| | | | | |
|---|---|---|---|---|
| 6,443,785 | B1* | 9/2002 | Swartz | B63H 25/382 114/162 |
| 7,105,942 | B2* | 9/2006 | Henriksen | B63B 35/44 290/42 |
| 7,438,259 | B1* | 10/2008 | Piasecki | B64C 27/26 244/17.13 |
| 7,541,688 | B2* | 6/2009 | Mackie | F03B 13/26 290/54 |
| 7,908,044 | B2* | 3/2011 | Piasecki | B64C 27/26 701/1 |
| 7,984,684 | B2* | 7/2011 | Hinderks | B63B 1/28 114/274 |
| 8,011,615 | B2* | 9/2011 | Silansky | B64B 1/02 244/30 |
| 8,102,071 | B2* | 1/2012 | Catlin | F03B 13/264 290/43 |
| 8,403,260 | B2* | 3/2013 | Thiele | B64F 1/14 244/114 R |
| 8,963,362 | B2* | 2/2015 | Sia | F03D 9/002 290/44 |
| 9,234,501 | B2* | 1/2016 | Sia | F03D 9/002 |
| 2002/0077009 | A1* | 6/2002 | Swartz | B63H 25/382 440/41 |
| 2003/0136873 | A1* | 7/2003 | Churchman | B64C 29/0025 244/10 |
| 2005/0236841 | A1* | 10/2005 | Henriksen | B63B 35/44 290/54 |
| 2008/0050993 | A1* | 2/2008 | Mackie | F03B 13/26 441/1 |
| 2008/0141921 | A1* | 6/2008 | Hinderks | B63B 1/28 114/274 |
| 2008/0237392 | A1* | 10/2008 | Piasecki | B64C 27/26 244/6 |
| 2009/0058090 | A1* | 3/2009 | Henriksen | B63B 35/44 290/53 |
| 2009/0230686 | A1* | 9/2009 | Catlin | F03B 13/264 290/54 |
| 2012/0227389 | A1* | 9/2012 | Hinderks | F01B 1/10 60/317 |
| 2013/0307274 | A1* | 11/2013 | Sia | F03D 9/002 290/55 |
| 2015/0137523 | A1* | 5/2015 | Sia | F03D 9/002 290/55 |
| 2015/0260095 | A1* | 9/2015 | Hinderks | B63B 1/28 123/568.11 |
| 2016/0115937 | A1* | 4/2016 | Pettersson | F03B 17/061 290/43 |

FOREIGN PATENT DOCUMENTS

| | | |
|---|---|---|
| KR | 1020120020293 | 3/2012 |
| KR | 1020120075251 | 7/2012 |
| KR | 1020140014201 | 2/2014 |

* cited by examiner

YAW CONTROL-BY-RUDDER TYPE TIDAL STREAM POWER GENERATION APPARATUS AND YAW CONTROL METHOD OF THE SAME

BACKGROUND OF THE INVENTION

1. Field of the Invention

The present invention relates to a yaw control-by-rudder type tidal stream power generation apparatus and a method for controlling the same, and more particularly, to a yaw control-by-rudder type tidal stream power generation apparatus and a method for controlling the same in which a nacelle is adapted to be rotated according to the changed flow direction of a tidal stream using drag and lift applied to the rudder.

2. Description of the Prior Art

Tidal stream power generation refers to a power generation method that generates power using the flow of seawater. Unlike tidal power generation which generates power using a sea level change by installing a breakwater on a shore, the tidal stream power generation rotates a turbine installed under the sea using sea currents without installing a dam or a breakwater in a sea area where rapid seawater streams appear.

Since the tidal stream power generation does not require construction of a breakwater and thus costs less than the tidal power generation. The tidal stream power generation is evaluated as being environmentally friendly in view of the fact that ships may freely sail, fish migrations are not disturbed, and the surrounding ecosystem is not affected.

The tidal stream power generation may be generally classified into two types according to the direction of a stream and the direction of a rotating shaft of a rotor. That is, the tidal stream power generation is classified into a Horizontal Axis Turbine (HAT) type, in which the direction of the stream and the direction of the rotating shaft of the rotor are parallel to each other, and a Vertical Axis Turbine (VAT) type, in which the direction of the stream and the direction of the rotating shaft of the rotor are perpendicular to each other.

In connection of the HAT type, Korean Laid-Open Patent Publication No. 2012-0020293 discloses a turret type tidal stream power generation apparatus, which is technically characterized in that the power generation apparatus includes: a rotating shaft positioned under the water to correspond tidal stream; a rudder mounted on the rotating shaft to be rotated about the rotating shaft; and power generation units which are connected to the opposite sides of the rudder, respectively, a water wheel being positioned at one side of each of the power generation units.

In the Korean Laid-Open Patent Publication No. 2012-0020293, the power generation units are configured in a turret type to change the direction thereof according to a tidal stream to make the direction of the tidal stream and the oriented direction of the water wheel coincident to each other so that the power generation efficiency can be improved. In addition, as the direction of the tidal stream and the direction of the power generation units are made to be coincident to each other, resistance to a tidal stream force can be minimized so that the robustness can be enhanced.

However, conventional HAT type tidal stream power generation apparatuses including that of Korean Laid-Open Patent Publication No. 2012-0020293 have problems in that since the rudder is fixed to the direction of the rotating shaft of the water wheel, when the direction of the tidal stream is finely changed, the change of direction of the water wheel is delayed with a time interval rather than being instantly performed in a changed direction of the tidal stream, and when the direction of the tidal stream is reversed, it is difficult to make the direction of the power generation units coincident thereto.

In connection with this, Korean Patent No. 10-1056695 discloses a tidal stream power generation apparatus that corrects eccentricity, and a method of correcting the eccentricity. The tidal stream power generation apparatus of the Korean Patent No. 10-1056695 is characterized in that it includes: a blade positioned in front of the body of the tidal stream power generation apparatus and rotated by a tidal stream; at least one tail wing positioned on a rear side of the body of the tidal stream power generation apparatus and configured to be extendible in a horizontal direction of the body; an RPM gauge positioned inside of the body of the tidal stream power generation apparatus to measure a rotating speed of the blade; and a correction module positioned inside of the body of the tidal stream power generation apparatus to adjust the length of the tail wing based on the rotating speed of the blade which is measured by the RPM gauge.

In the Korean Patent No. 10-1056695, since the length of the tail wing is adjusted by the correction module included in the body so that the blade maintains its direction vertically in relation to the flow direction of the tidal stream, the efficiency of the tidal stream power generation can be maximized.

The conventional tidal stream power generation apparatuses including those disclosed in Korean Patent No. 10-1056695 may improve the power generation efficiency obtained by the blade by actively rotating the tidal stream power generation apparatus toward the flow direction of the tidal stream by adjusting the length of the tail wing whenever the flow direction of the tidal stream is changed. However, since the length of the tail wing (where lift and drag is generated by the flowing energy of the tidal stream) should be adjusted to rotate the tidal stream power generation apparatus whenever the flow direction of the tidal stream is changed, the power generation efficiency of the tidal stream power generation apparatus is rapidly reduced by the energy used for adjusting the length of the tail wing.

In addition, the conventional tidal stream power generation apparatus, which measures the rotating speed of the blade using the RPM gauge and the length of the tail wing is adjusted depending on the variation of RPM as disclosed in Korean Patent No. 10-1056695, has a disadvantage in that even if the running velocity of the tidal stream is changed, but the direction of the tidal stream is not changed, the length of the tail length is changed due to the change of RPM to rotate the blade which degrades the power generation efficiency.

PRIOR ART DOCUMENT

Patent Document (0001) Korean Laid-Open Patent Publication No. 2012-0020293 (published on Mar. 8, 2012)

(0002) Korean Patent No. 10-1056695 (registered on Aug. 8, 2011).

SUMMARY OF THE INVENTION

An object of the present invention is to provide a yaw control-by-rudder type tidal stream power generation apparatus and a method for controlling the same, in which a nacelle is configured to rapidly change a direction toward a flow direction even when a flow direction of a tidal stream is finely changed or reversed.

Another object of the present invention is to provide a yaw control-by-rudder type tidal stream power generation apparatus and a method for controlling the same, in which a ratio of an energy used for changing a direction of a nacelle is reduced as compared with drag and lift acting on a rudder unit by a flowing energy of a tidal stream so that the power generation efficiency of the tidal stream power generation apparatus can be further improved.

In order to achieve the objects described above, the present invention provides a yaw control-by-rudder type tidal stream power generation apparatus. The power generation apparatus includes: a nacelle used in a tidal stream power generator that converts flowing energy of a tidal stream to generate electric power, and disposed in the tidal stream to be rotatable about a first rotating shaft; a rotor provided at one side of the nacelle with reference to the first rotating shaft, and configured to be rotated by the flowing energy of the tidal stream; a rudder unit provided at the other side of the nacelle with reference to the first rotating shaft, and including a rudder fixed to the nacelle and a variable rudder rotatably connected to the nacelle; and a control unit configured to control the rotation of the variable rudder. When the flow direction of the tidal stream is changed, the rotation of the variable rudder is controlled by the control unit so that drag and lift are generated on the rudder unit to rotate the nacelle to the flow direction of the tidal stream.

The variable rudder may be connected to the nacelle to be rotatable about a second rotating shaft, and the second rotating shaft may be coupled to an actuator unit within the nacelle.

The actuator unit may include: a third rotating shaft configured to be cooperatively rotated with the second rotating shaft by a first bevel gear set; and a motor unit configured to transmit a rotary power to the third rotating shaft, and connected with the control unit.

The first rotating shaft and the second rotating shaft may be configured to be parallel to each other and extend in opposite directions from the nacelle.

The fixed rudder and the variable rudder may extend in opposite direction from the nacelle.

A pair of fixed rudders may be provided to extend from the nacelle within an included angle between the first rotating shaft and the second rotating shaft and arranged to be symmetric to each other with reference to the second rotating shaft.

The yaw control-by-rudder type tidal stream power generation apparatus may further include a power transmission shaft within the first rotating shaft. The power transmission shaft may be configured to be cooperatively rotated with the rotating shaft rotor by a second bevel gear set.

The yaw control-by-rudder type tidal stream power generation apparatus may further include: a first detection sensor configured to detect a flow direction and speed of the tidal stream; a second detection sensor configured to detect a rotating angle and speed of the variable rudder; and a third detection sensor configured to detect a rotating angle and speed of the nacelle. The control unit may control the rotation of the variable rudder by receiving a signal from each of the first detection sensor, the second detection sensor, and the third detection sensor.

The fixed rudder and the variable rudder may be formed in a streamlined shape, and the variable rudder may generate drag and lift that reverse the direction of the nacelle in the process where a front end of the variable rudder is rotated toward a coming tidal stream when the flow direction of the tidal stream is reversed and then returned to its original position.

According to another aspect, the present invention provides a method for controlling a yaw control-by-rudder type tidal stream power generation apparatus as described above. The method includes: an error setting step of setting an error allowance range between the direction of the rotating shaft of the rotor and the flow direction of the tidal stream; a rotation control step of comparing the direction of the rotating shaft of the rotor and the flow direction of the tidal stream, and when the error allowance range is exceeded, controlling the variable rudder by the control unit; and a rudder initialization step of initializing the position of the variable rudder by the control unit when the error allowance range is not exceeded as a result of comparing the direction of the rotating shaft of the rotor and the flow direction of the tidal stream.

When the flow direction of the tidal stream is reversed, the rotation control step may include: a torque generation step of controlling the rotation of the variable rudder by the control unit so that the front end of the variable rudder is directed to the coming tidal stream; an accelerating rotation step of controlling the rotation of the variable rudder to a $1r_{th}$ rotating angle by the control unit so that the nacelle accelerates rotation to a $1n_{th}$ rotating angle when the flowing energy of the tidal stream arrives at a first flowing speed; a decelerating rotation step of controlling the rotation of the variable rudder to a $2r_{th}$ rotating angle by the control unit when the nacelle is rotated to the $1n_{th}$ rotating angle so that the nacelle decelerates rotation to a $2n_{th}$ rotating angle; and a precise control step of controlling the rotation of the variable rudder by the control unit to cause the direction of the rotating shaft of the rotor to be directed toward the flow direction of the tidal stream when the nacelle is rotated to the $2n_{th}$ rotating angle.

The $1n_{th}$ rotating angle may form 90 degrees with reference to the rudder initialization step, and the $2n_{th}$ rotating angle may form 45 degrees with reference to the rudder initialization step.

According to the present invention, it is possible to provide a yaw control-by-rudder type tidal stream power generation apparatus and a method for controlling the same, in which when the flow direction of a tidal stream is changed, the rotation of the variable rudder is controlled by the control unit to generate drag and lift on the rudder unit to rotate the nacelle to the flow direction of the tidal stream so that even when the flow direction of the tidal stream is finely changed or reversed, the direction of the nacelle can be changed quickly to the flow direction of the tidal stream.

It is also possible to provide a yaw control-by-rudder type tidal stream power generation apparatus and a method for controlling the same, in which when the flow direction of a tidal stream is changed, the rotation of the variable rudder is controlled by the control unit to generate drag and lift on the rudder unit to rotate the nacelle to the flow direction of the tidal stream so that the energy consumption required to change the direction of the nacelle can be minimized by generating the torque using the flowing energy of the tidal stream, and through this, the power generation efficiency of the tidal stream power generation apparatus can be further improved.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE EXEMPLARY EMBODIMENTS

Hereinafter, the preferred embodiments of the present invention will be described in detail as follows. In the description of the present invention, the description of the well-known function or structure will be omitted in order to clear the subject matter of the present invention.

A yaw control-by-rudder type tidal stream power generation apparatus of the present invention and a method of controlling the same are configured to quickly change a direction of a nacelle to a changed flow direction of a tidal stream even when the direction of the tidal stream is finely changed or reversed.

In addition, the yaw control-by-rudder type tidal stream power generation apparatus of the present invention and the method of controlling the same are configured to use drag and lift generated on a rudder unit by the kinetic energy of the tidal stream so that an energy consumed for changing the direction of the nacelle can be minimized, thereby further improving the power generation efficiency of the tidal stream power generation apparatus.

Figure 1:
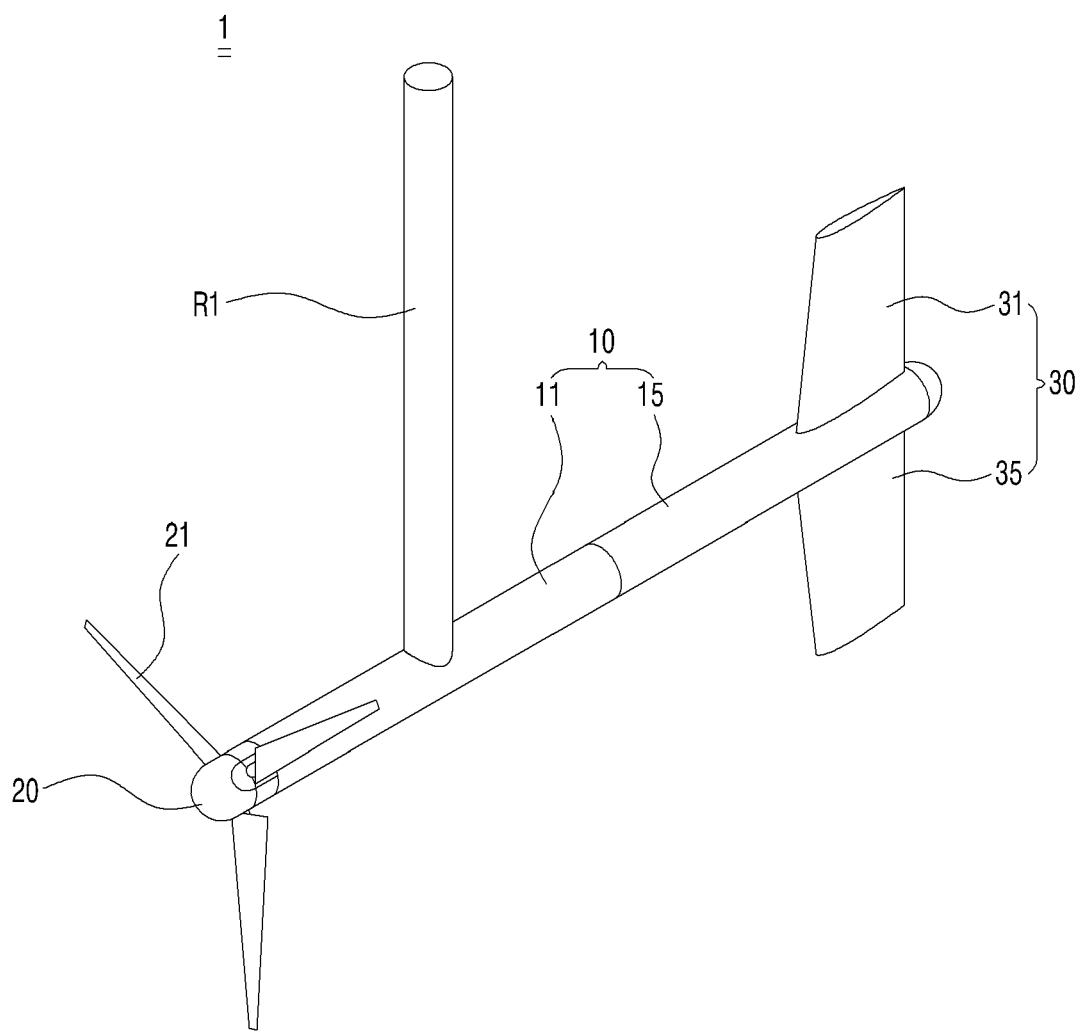
FIG. 1 is a perspective view illustrating a yaw control-by-rudder type tidal stream power generation apparatus, according to an exemplary embodiment of the present invention.
Figure 2:
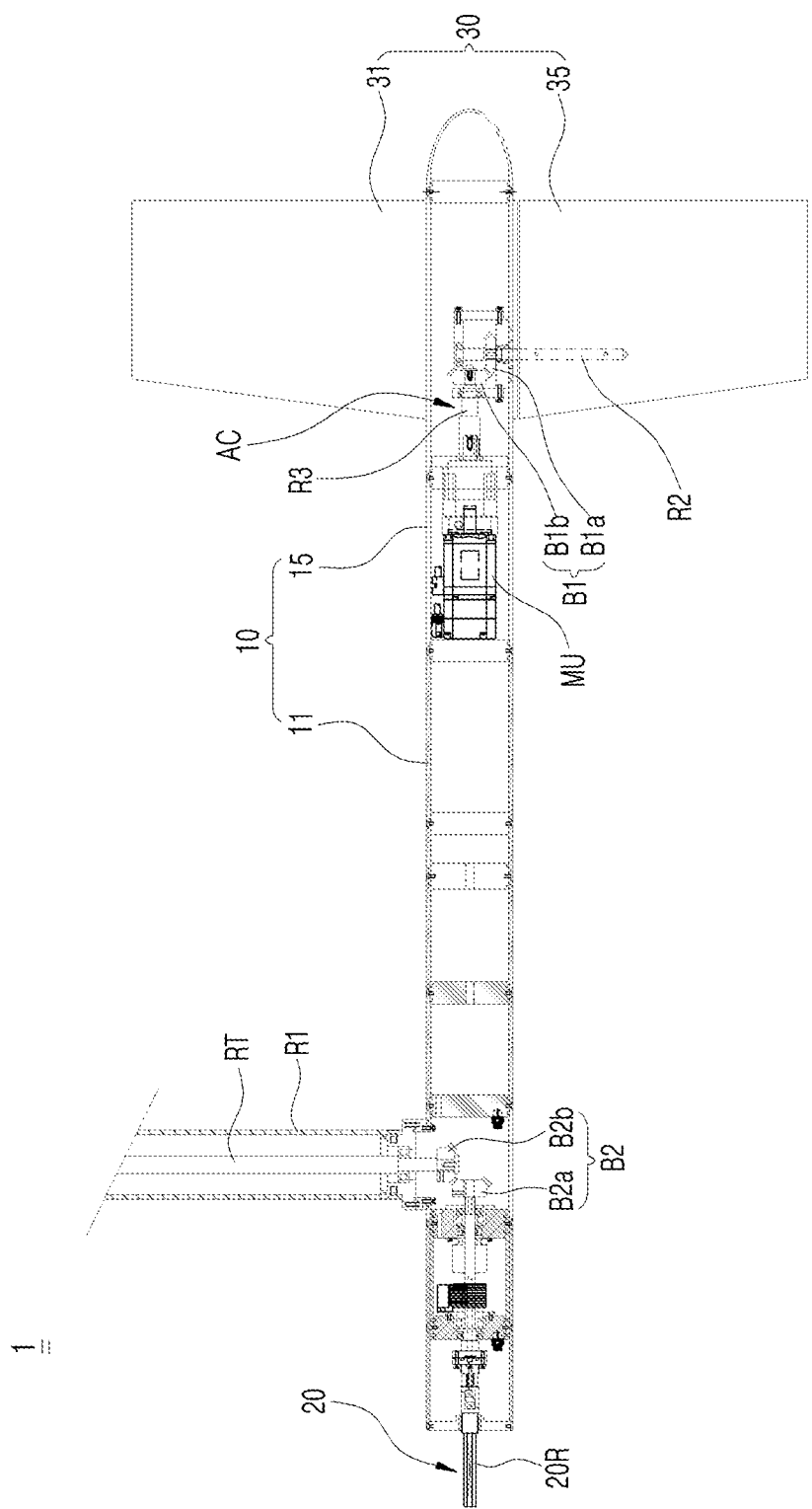
FIG. 2 is a longitudinal cross-sectional view of the yaw control-by-rudder type tidal stream power generation apparatus of FIG. 1.
Figure 3:
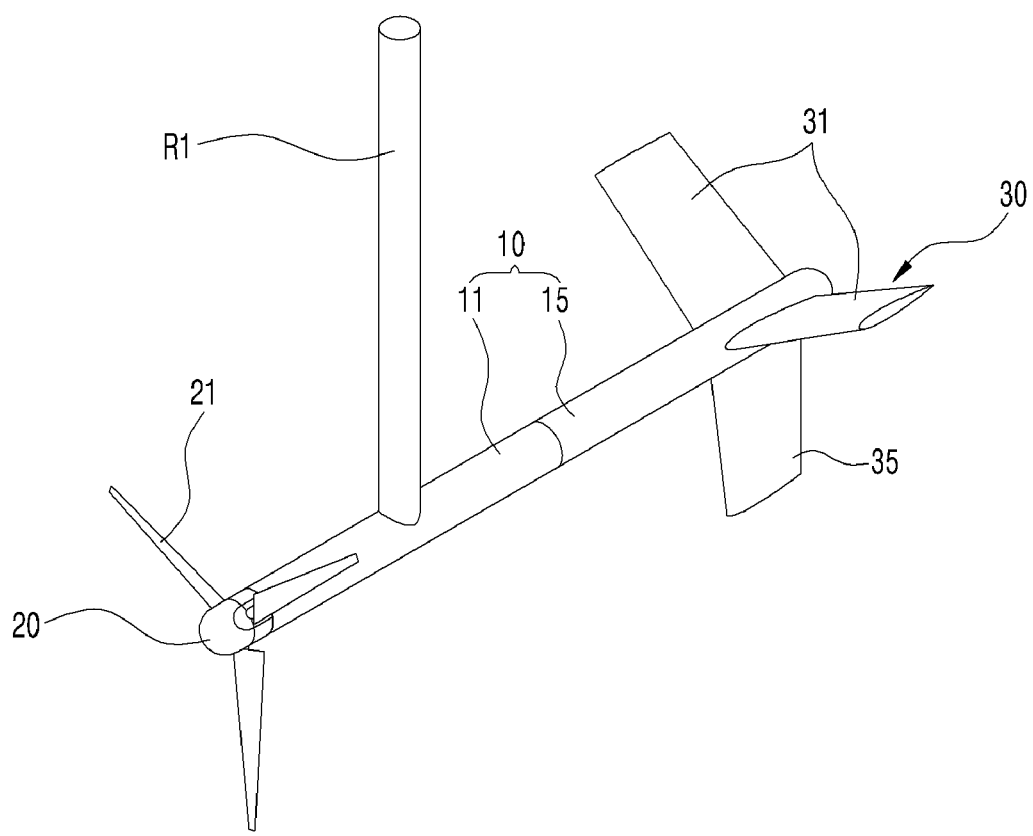
FIG. 3 is a perspective view illustrating a yaw control-by-rudder type tidal stream power generation apparatus according to another exemplary embodiment of the present invention.
Figure 4:
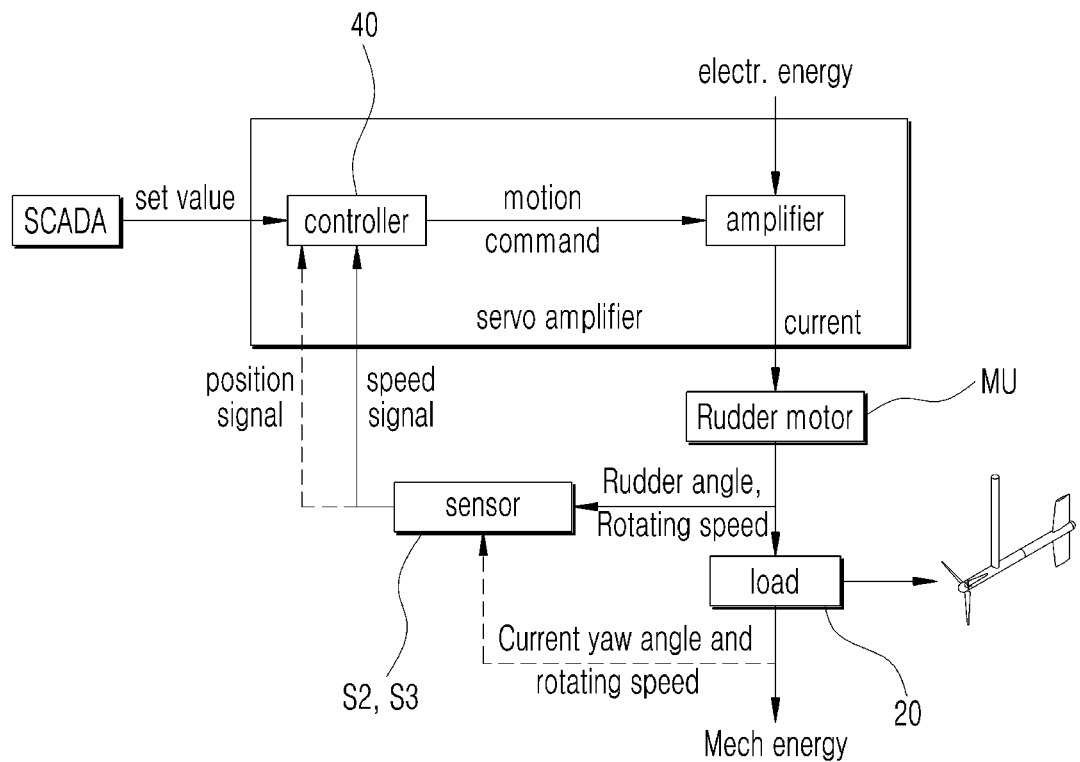
FIG. 4 is a view illustrating a control concept of a control method of the yaw control-by-rudder type tidal stream power generation apparatus of FIG. 1.
Figure 5:
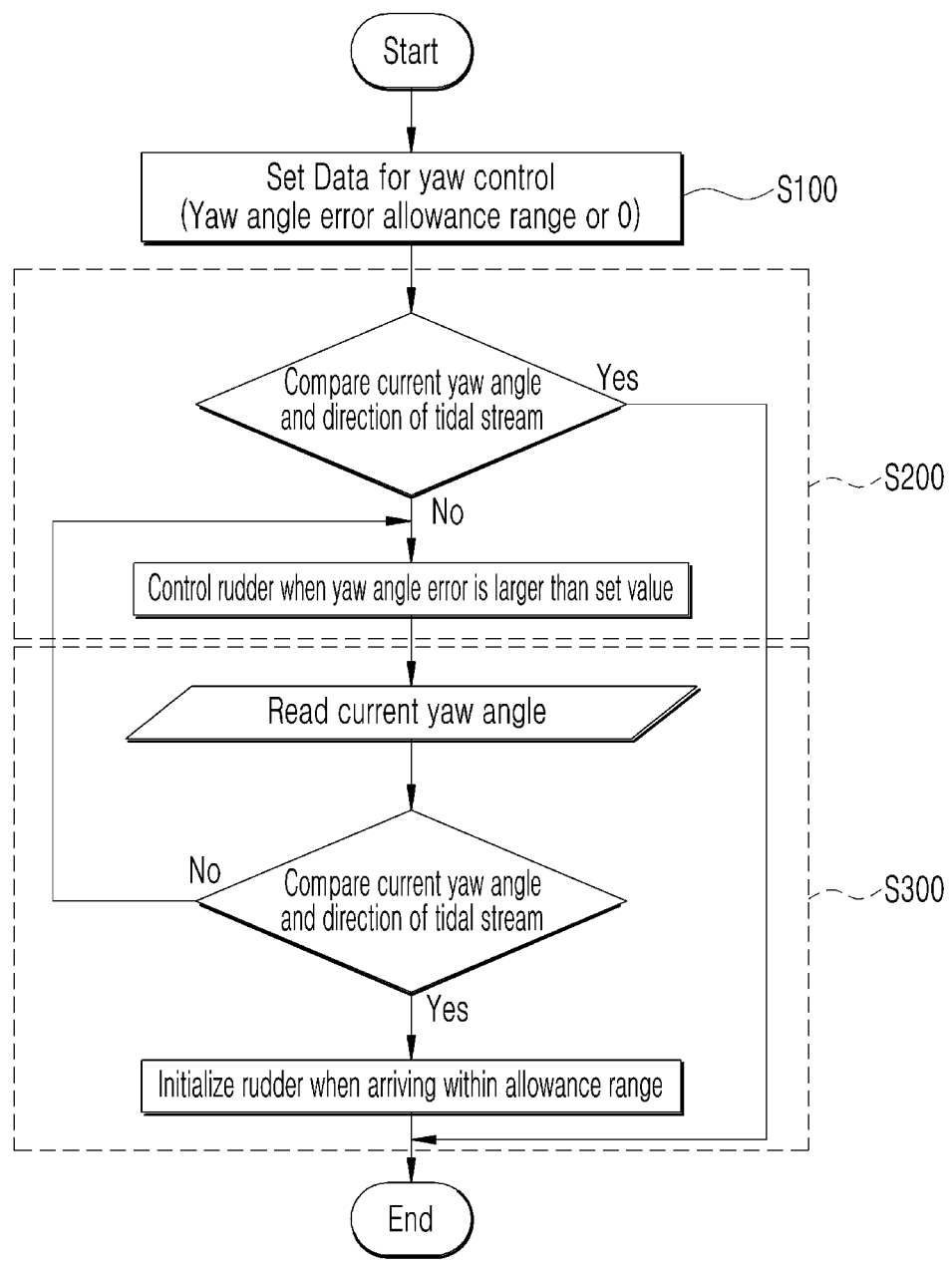
FIGS. 5 and 6 are control algorithm flowcharts of a method for controlling the yaw control-by-rudder type tidal stream power generation apparatus of FIG. 1.
Figure 6:
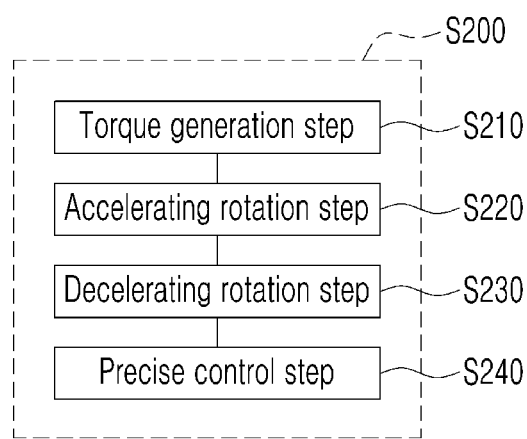
Figure 7:
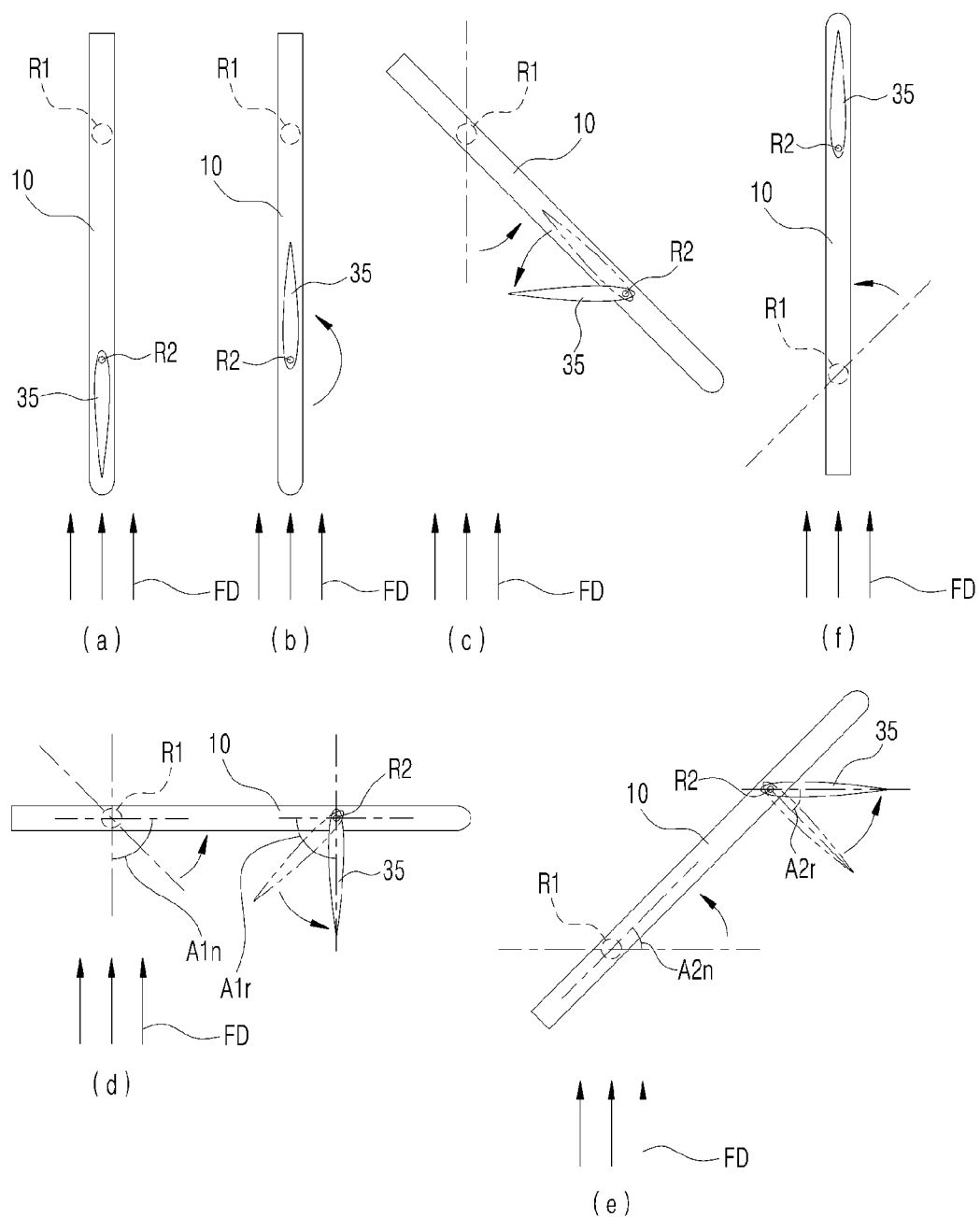
FIG. 7 is views illustrating operating states of the yaw control-by-rudder type tidal stream power generation apparatus of FIG. 1.
Figure 8:
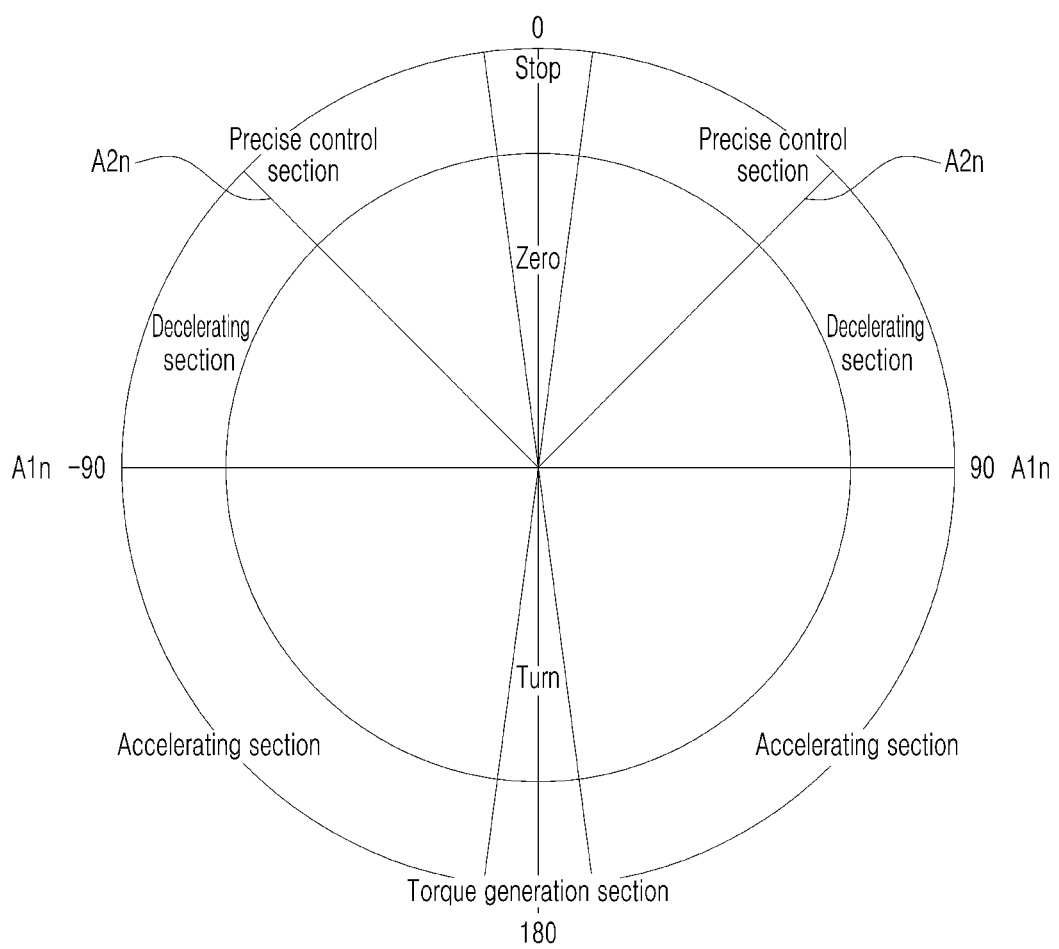
FIG. 8 is a view illustrating a control section when the flow direction of a tidal stream is reversed in the method for controlling the yaw control-by-rudder type tidal stream power generation apparatus of FIG. 1.

FIG. 1 is a perspective view illustrating a yaw control-by-rudder type tidal stream power generation apparatus, according to an exemplary embodiment of the present invention. FIG. 2 is a longitudinal cross-sectional view of the yaw control-by-rudder type tidal stream power generation apparatus of FIG. 1. FIG. 3 is a perspective view illustrating a yaw control-by-rudder type tidal stream power generation apparatus according to another exemplary embodiment of the present invention. FIG. 4 is a view illustrating a control concept of a control method of the yaw control-by-rudder type tidal stream power generation apparatus of FIG. 1. FIGS. 5 and 6 are control algorithm flowcharts of a method for controlling the yaw control-by-rudder type tidal stream power generation apparatus of FIG. 1. (a) to (f) of FIG. 7 are views illustrating operating states of the yaw control-by-rudder type tidal stream power generation apparatus of FIG. 1. FIG. 8 is a view illustrating a control section when the flow direction of a tidal stream is reversed in the method for controlling the yaw control-by-rudder type tidal stream power generation apparatus of FIG. 1.

As illustrated in FIGS. 1 and 2, a yaw control-by-rudder type tidal stream power generation apparatus 1 according to an exemplary embodiment of the present invention includes a nacelle 10, a rotor 20, a rudder unit 30, and a control unit 40, in which a torque is formed to rotate the nacelle 10 by drag and lift applied to the rudder unit 30 according to a changed flow direction FD of a tidal stream. The nacelle 10 is located in a tidal stream to be rotatable about a first rotating shaft R1, and the rotor 20 and the rudder unit 30 are respectively coupled to the opposite sides with reference to the first rotating shaft R1.

The nacelle 10 is formed in an elongated cylindrical shape extending in a direction, and the rotating shaft 20R of the rotor 20 is installed to be parallel to the longitudinal direction of the nacelle 10 so that the generation of friction between the tidal stream and the nacelle 10 which is caused by the shape of the nacelle 10 in the front and the rear of the rotor 20 may be minimized. Within the nacelle 10, a configuration for transmitting the rotatory power of the rotor 20 to a generator (not illustrated) (a second bevel gear set B2, and a power transmission shaft RT), and an actuator unit AC configured to transmit the rotatory power to the rudder unit 30.

The nacelle 10 includes a front nacelle 11 and a rear nacelle 15.

As illustrated in FIG. 2, the front nacelle 11 is composed of the rotor 20, the first rotating shaft R1, a configuration for transmitting the rotary power of the rotor 20 to the generator side (a second bevel gear set B2), and a power transmission shaft RT, and the rear nacelle 15 is composed of the rudder unit 30 and the actuator unit AC configured to transmit the rotatory power to the rudder unit 30.

The front nacelle 11 and the rear nacelle 15 are formed in cylindrical shapes having the same diameter and coupled to each other in the longitudinal direction of the rotating shaft 20R of the rotor 20. This coupling structure enables adoption of a modular assembly type and provides convenience in disassembly and assembly in follow-up maintenance.

When an external force larger than a predetermined magnitude, i.e. drag and lift by flowing energy of the tidal stream is applied to the rudder unit 30, the nacelle 10 is rotated about the first rotating shaft R1. The first rotating shaft R1 is formed to extend in a direction perpendicular to the longitudinal direction of the front nacelle 11 from a central portion of the front nacelle 11, and a power transmission shaft RT is provided within the first rotating shaft R1.

The power transmission shaft RT is configured to transmit the rotatory power of the rotor 20 to the generator side, and rotated in cooperation with the rotating shaft 20R of the rotor 20 by the second bevel gear set B2. The second bevel gear set B2 includes a $2a_{th}$ bevel gear B2a coupled to the rotating shaft 20R and a $2b_{th}$ gear B2b coupled to the power transmission shaft RT so that the rotating shaft 20R of the rotor 20 and the power transmission shaft RT, which are perpendicular to each other can be cooperatively rotated.

Although not illustrated, the generator may be installed within the front nacelle 11. In this configuration, the rotating shaft 20R of the rotor 20 may be directly connected to the generator. Thus, the power transmission shaft RT and the second bevel gear set B2 may not be provided.

As illustrated in FIGS. 1 and 2, the rotor 20 is formed on a front end of the nacelle 10 with reference to the first rotating shaft R1, and the rudder unit 30 is formed on a rear end of the nacelle 10 with reference to the first rotating shaft R1.

A HAT type tidal stream power generation apparatus includes two or more blades formed on a hub of a rotor so that a rotary power is generated by lift and drag formed on the blades by the flowing energy of a tidal stream. Typically, the hub of the rotor is provided on an end of a nacelle in a tidal stream coming direction to minimize the loss of flowing energy of the tidal stream by the nacelle.

Similarly, in the yaw control-by-rudder type tidal stream power generation apparatus 1 according to an exemplary embodiment of the present invention, the rotor 20 is also provided on the end of the nacelle 10 in the tidal stream coming direction. The "front end" of the nacelle 10 described above refers to the end which is directed toward the flow direction FD of the coming tidal stream and provided with the rotor 20. In addition, the "rear end" of the nacelle 10 refers to the end opposite to the front end. That is, the rear end refers the other end opposite to the front end of the nacelle 10 provided with the rotor 20 with reference to the first rotating shaft R1.

As illustrated in FIGS. 1 and 2, the rudder unit 30 is configured to rotate the nacelle 10 according to the flow direction FD of the tidal stream, and provided on the rear end of the nacelle 10 with reference to the first rotating shaft R1.

The rudder unit 30 includes a fixed rudder 31 and a variable rudder 35. The fixed rudder 31 is fixed to the nacelle 10, and the variable rudder 35 is rotatably connected to the nacelle 10.

Each of the fixed rudder 31 and the variable rudder 35 is formed in a streamlined shape. When the flow direction FD of the tidal stream is parallel to the rotating shaft 20R of the rotor 20, that is, when the flowing energy of the tidal stream generates drag and lift on the blades 21 of the rotor 20 with the highest efficiency, the central line connecting the front and rear ends of the streamlined shape becomes parallel to the longitudinal center line of the nacelle 10 which is coaxial to the rotating shaft 20R of the rotor 20.

Meanwhile, when the flow direction FD of the tidal stream forms an inclined angle with the rotating shaft 20R of the rotor 20, that is, when the flow direction FD of the tidal stream is changed so that the drag and lift generated on the blades 21 of the rotor 20 by the flowing energy of the tidal stream are reduced, drag and lift is generated on the fixed rudder 31 and the variable rudder 35 by the flowing energy of the tidal stream. As a result, a torque is generated with reference to the first rotating shaft R1 so that the nacelle 10 is rotated.

Since the fixed rudder 31 is fixed to the nacelle 10, the drag and lift generated on the fixed rudder 31 have a magnitude that is determined by the inclined angle between the flow direction FD of the tidal stream and the nacelle 10 as a variable. Since the variable rudder 35 is rotatably connected to the nacelle 10, the drag and lift generated on the variable rudder 35 have a magnitude which is determined by the inclined angle between the flow direction FD of the tidal stream and the nacelle 10 and the rotating angle of the variable rudder 35 as variables.

Although not illustrated, the control unit 40 is installed within the nacelle 10 or at the generator side to control the rotation of the variable rudder 35.

Accordingly, when the flow direction FD of the tidal stream is changed, the magnitude of the drag and lift acting on the rudder unit 30 to rotate the nacelle 10 to the flow direction FD of the tidal stream is adjusted by controlling the rotation of the variable rudder 35 by the control unit 40 so that the yaw control-by-rudder type tidal stream power generation apparatus 1 can change its direction instantly when the flow direction FD of the tidal stream FD is changed, thereby maintaining the power generation efficiency highly as compared to the case where only the fixed rudder 31 is provided. In addition, the drag and lift acting on the entire rudder unit 30 become lager as compared to the force required for rotating the variable rudder 35, thereby reducing the energy consumption to improve the entire power generation efficiency and economic efficiency as compared to the case where only the variable rudder 35 is provided.

As illustrated in FIG. 2, the variable rudder 35 is connected to the nacelle 10 to be rotatable about the second rotating shaft R2. It is preferable that the second rotating shaft R2 and the first rotating shaft R1 are formed to be parallel to each other so that even when the variable rudder 35 is rotated, the direction of the drag and lift generated on any one surface of the variable rudder 35 becomes perpendicular to the first rotating shaft R1.

In addition, it is preferable that the first rotating shaft R1 and the second rotating shaft R2 extend in the opposite directions from the nacelle 10 so that the flow of the tidal stream is not weaken much on the variable rudder 35 side in the state where the flowing energy is reduced after the tidal stream is rubbed against the first rotating shaft R1.

As illustrated in FIGS. 1 and 2, it is preferable that the fixed rudder 31 extend from the nacelle 10 in the direction opposite to the variable rudder 35. The flowing energy of the tidal stream acting on the fixed rudder 31 may be somewhat reduced as the tidal stream rubs against the first rotating shaft R1. However, since the direction of the drag and lift generated on any one surface of the fixed rudder 31 is perpendicular to the first rotating shaft R1, the drag and lift generated on the entire rudder unit 30 can be maximized.

Referring to FIG. 3, a pair of fixed rudders 31 may be provided to extend from the nacelle 10 in the directions different from the direction of the first rotating shaft R1 and the second rotating shaft R2 and to be symmetrical to each other with reference to the second rotating shaft R2.

When the fixed rudders 31 are positioned within the included angle between the first rotating shaft R1 and the second rotating shaft R2 rather than being positioned opposite to the variable rudder 35, the inclined angle between the acting direction of the drag and lift acting on any one surface of the fixed rudders 31 and the rotating direction of the first rotating shaft R1 may be somewhat increased as compared to the case where the fixed rudder 31 and the variable rudder 35 are formed opposite to each other. However, since the reduced amount of the flowing energy of the tidal stream by the interference of the first rotating shaft R1 is minor, the reduction of the entire torque acting on the nacelle 10 is minimized.

In addition, the ratio of the drag and lift acting on the variable rudder 35 in relation to the drag and lift acting on the entire rudder unit 30 may be adjusted according to the angle formed by the fixed rudders 31. In addition, since the fixed rudders 31 are installed to be symmetric to each other in the horizontal direction, an advantage may be obtained in aligning the nacelle 10 to the flow direction FD when the direction of the tidal stream is finely changed.

As illustrated in FIG. 2, the second rotating shaft R2 is coupled to the actuator unit AC within the nacelle 10. The actuator unit AC includes a third rotating shaft R3 rotated in cooperation to the second rotating shaft R2 by the first bevel gear set B1 and a motor unit MU configured to transmit the rotatory power to the third rotating shaft R3.

When the actuator unit AC and the second rotating shaft R2 are engaged with each other by the first bevel gear set B1, the rotating shaft of the motor unit MU may be installed along the longitudinal direction of the rear nacelle 15 formed in a cylindrical shape. Accordingly, a convenience in installing the motor unit MU may be improved. Further, since the inner periphery of the rear nacelle 15 may be formed to have a diameter slightly larger than the diameter of the motor unit MU, the cross-sectional size of the nacelle 10 may be minimized.

Referring to FIG. 4, the control unit 40 controls the rotation of the variable rudder 35 by receiving signals from a first detection sensor (not illustrated), a second detection sensor S2, and a third detection sensor S3.

The first detection sensor is configured to detect the flow direction FD and the flowing speed of the tidal stream. The first detection sensor may be installed on one side of the nacelle 10. However, it is preferable that the first detection is separately provided at a fixed position. The second detection sensor S2 is configured to detect the rotating angle and speed of the variable rudder 35 and installed within the rear nacelle 15 to detect the rotation of the second rotating shaft R2. The third detection sensor S3 is configured to detect the rotating angle and speed of the nacelle 10 and installed preferably on an external fixed body (not illustrated) to detect the rotation of the first rotating shaft R1.

The tidal stream is characterized in that it flows in opposite directions at the ebb and flow thereof, and finely changes one directional flow during the ebb or flow.

Accordingly, the nacelle 10 of the tidal stream power generation apparatus 1 should be quickly reversed when the flow direction FD of the tidal stream is reversed by the ebb and flow, and when the flow direction FD is finely changed during the one directional flow of the tidal stream, the nacelle 10 should be quickly rotated to be parallel to the finely changed direction of the tidal stream.

As illustrated in FIG. 5, a control method of the yaw control-by-rudder type tidal stream power generation apparatus 1 is performed in the following sequence (see FIG. 2)

First, error setting step S100 is performed to set an error allowance range between the direction of the rotating shaft 20R of the rotor 20 and the flow direction FD of the tidal stream.

The error allowance range is set as 0 or ±X1 degrees. X1 degrees refer to a variably set error allowance range, the symbol "±" refers to a clockwise or counterclockwise inclined angle of the flow direction FD of the tidal stream in relation to the direction of the rotating shaft 20R of the rotor 20.

After the error allowance range is set, the direction of the rotating shaft 20R of the rotor 20 and the flow direction FD of the tidal stream are compared with each other, and when the inclined angle exceeds the error allowance range, rotation control step S200 is performed in which the control unit 40 controls the rotation of the variable rudder 35.

The direction of the rotating shaft 20R of the rotor 20 is detected by the third detection sensor S3 that detects the rotating angle and speed of the nacelle 10 (see FIG. 4). The flow direction FD of the tidal stream is sensed by the first detection sensor that detects the flow direction FD and flowing speed of the tidal stream. The control unit 40 compares the measured values of the first detection sensor and the third detection sensor S3 to determine whether the error allowance range is exceeded. When the error allowance range is exceeded, the actuator unit AC is controlled to control the rotation of the variable rudder 35. The rotating angle and speed of the variable rudder 35 is detected by the second detection sensor S2.

In addition, when the error allowance range is not exceeded as a result of comparing the direction of the rotating shaft 20R of the rotor 20 and the flow direction FD of the tidal stream, rudder initialization step S300 is performed in which the control unit 40 initializes the position of the variable rudder 35. When the position of the variable rudder 35 is initialized, the current rotating angle of the variable rudder 35 is stored as a reference angle of the error allowance range, i.e. 0 degree where the direction of the rotating shaft 20R of the rotor 20 and the flow direction FD of the tidal stream coincide with each other.

The tidal stream power generation apparatus 1 of the present invention is characterized in that drag and lift are generated to reverse the direction of the nacelle 10 in the process where the front end of the variable rudder 35 returns to its original position after it is rotated toward the coming tidal stream when the flow direction FD of the tidal stream is reversed.

Referring to FIGS. 6, 7 and 8, when the flow direction FD of the tidal stream is reversed, rotation control step S200 including the followings steps is performed.

First, torque generation step 210 is performed in which the control unit 40 controls the rotation of the variable rudder 35 so that the front end of the variable rudder 35 is directed toward the coming tidal stream.

When the flow direction FD of the tidal stream is reversed, the rear end of the variable rudder 35 is directed toward the coming tidal stream (see, (a) of FIG. 7), and when the first detection sensor detects the reversal of the tidal stream, the control unit 40 rotates the variable rudder 35 about 180 degrees so that the front end of the variable rudder 35 is directed toward the coming tidal stream (see (b) of FIG. 7).

When the flowing energy of the tidal stream arrives at a first flowing speed, accelerating rotation step S220 is performed in which the control unit 40 controls the rotation of the variable rudder 35 to a $1n_{th}$ rotating angle A1r so that the nacelle 10 accelerates rotation to a $1n_{th}$ rotating angle A1n (see (c) to (d) of FIG. 7).

The first flowing speed refers to a flowing speed of the tidal stream generating drag and lift on the rudder unit 30 to a magnitude which is sufficient for rotating the nacelle 10 when the rotation of the variable rudder 35 is controlled. The first flowing speed is determined depending on the areas of the fixed rudder 31 and the variable rudder 35, the distance between the first rotating shaft R1 and the rudder unit 30, and the weight of the tidal stream power generation apparatus 1.

It is preferable that the $1n_{th}$ rotating angle A1n is set to 90 degrees with reference to rudder initialization step S300. Rudder initialization step S300 refers to a step in which the difference between the direction of the rotating shaft 20R of the rotor 20 and the flow direction FD of the tidal stream is within the error allowance range and the difference is determined by the measurement values of the first detection sensor.

When the nacelle 10 is rotated by 90 degrees with reference to rudder initialization step S300 (see (d) of FIG. 7), the drag and lift acting on the fixed rudder 31 is maximized. Since the torque generated by the drag and lift acting on the fixed rudder 31 increases and then decreases at about 90 degrees, the $1n_{th}$ of 90 degrees with reference to rudder initialization step S300 means a rotating angle which allows the rotating speed of the nacelle 10 to be determined by adjusting the magnitude of the torque generated in the rudder unit 30 by controlling the rotation of the variable rudder 35.

The $1r_{th}$ rotating angle A1r of the variable rudder 35 in the accelerating rotation step is about 90 degrees. The drag and lift acting on the variable rudder 35 are generated in the rotating direction of the variable rudder 35, the rotating direction of the variable rudder 35 and the rotating direction of the nacelle 10 coincide with each other, and the torque generated by the drag and lift acting on the variable rudder 35 in the accelerating rotation step increases and then decreases to approximately 0.

As a result, the total torque generated in the nacelle 10 in the accelerating rotation step continuously increases, and the increasing rate gradually decreases. Of course, in the accelerating rotation step, the $1r_{th}$ rotating angle of the variable rudder 35 may be set to be 90 degrees or more or 90 degrees or less.

When the nacelle 10 is rotated by the $1n_{th}$ rotating angle A1n through the accelerating rotation step, decelerating rotation step S230 is performed in which the control unit 40 controls the rotation of the variable rudder 35 to the $2r_{th}$ rotating angle A2r so that the nacelle 10 decelerates rotation to the $2n_{th}$ rotating angle A2n (see (e) of FIG. 7). It is preferable that the $2n_{th}$ rotating angle A2n is set to about 45 degrees with reference to rudder initialization step S300.

When the accelerating rotation step is completed, the drag and lift acting on the rudder unit 30 are maximized, and the angle of the fixed rudder 31 in decelerating rotation step S230 is changed from 90 degrees to 45 degrees with reference to rudder initialization step S300, and at this time, the torque by the drag and lift decreases.

Meanwhile, it is preferable that the variable rudder 35 is rotated by the $2r_{th}$ rotating angle A2r in a range of about 90 degrees to 180 degrees in decelerating rotation step S230. At this time, the torque by the draft and lift acting on the variable rudder 35 increases and then decreases with reference to rudder initialization step S300. However, since the increasing rate when the torque increases is lower than the decreasing rate in the fixed rudder 31, the total torque acting on the nacelle 10 in decelerating rotation step S230 continuously decreases.

When the nacelle 10 is rotated by the $2n_{th}$ rotating angle, precise control step S240 is performed in which the control unit 40 controls the rotation of the variable rudder 35 so that the direction of the rotating shaft 20R of the rotor 20 is directed toward the flow direction FD of the tidal stream (see (f) of FIG. 7)

In precise control step S240, the torque of the fixed rudder 31 continuously decreases and consequently converges to 0 degree with reference to rudder initialization step S300, and the variable rudder 35 is rotated to a rotating angle of 180 degrees or more to the flow direction of the tidal stream, thereby preventing the nacelle 10 from being rotated 0 degree or less with reference to rudder initialization step S300.

That is, the torque acting on the nacelle 10 by the drag and lift acting on the variable rudder 35 decreases to 0 or less (generating a torque in the opposite direction) and then converges 0 when the flow direction FD of the tidal stream and the direction of the rotating shaft 20R of the rotor 20 become coincident with each other.

When the flow direction FD of the tidal stream is finely changed, rotation control step S200 only includes precise control step S240 (see FIGS. 6 and 7). That is, when the flow direction FD of the tidal stream is finely changed, the flow direction FD of the tidal stream and the direction of the rotating shaft 20R of the rotor 20 form an inclined angle of 45 degrees or less. Thus, the flow direction FD of the tidal stream and the direction of the rotating shaft 20R of the rotor 20 are made to coincide with each other by precisely controlling the variable rudder 35 in the clockwise and counterclockwise directions.

According to the present invention, it is possible to provide a yaw control-by-rudder type tidal stream power generation apparatus 1 and a method for controlling the same, in which when the flow direction FD of a tidal stream is changed, the rotation of the variable rudder 35 is controlled by the control unit 40 to generate drag and lift on the rudder unit 30 to rotate the nacelle 10 to the flow direction FD of the tidal stream so that even when the flow direction FD of the tidal stream is finely changed or reversed, the direction of the nacelle 10 can be changed quickly to the flow direction FD of the tidal stream.

It is also possible to provide a yaw control-by-rudder type tidal stream power generation apparatus 1 and a method for controlling the same, in which when the flow direction FD of a tidal stream is changed, the rotation of the variable rudder 35 is controlled by the control unit 40 to generate drag and lift on the rudder unit 30 to rotate the nacelle 10 to the flow direction FD of the tidal stream so that the energy consumption required to change the direction of the nacelle 10 can be minimized by generating the torque using the flowing energy of the tidal stream, and through this, the power generation efficiency of the tidal stream power generation apparatus 1 can be further improved.

Although the exemplary embodiment of the present invention is described and shown, it is obvious to a person skilled in the art that the present invention is not limited to the described embodiment and may be changed and modified in various forms without departing from the spirit and scope of the present invention. Accordingly, modifications or variations should not be individually understood in view of the technical spirit of the present invention, and it must be understood the modifications and the variations belong to the claims of the present invention.

What is claimed is:

1. A yaw control-by-rudder type tidal stream power generation apparatus for converting flowing energy of a tidal stream into electric power, the apparatus comprising:
a nacelle located in a tidal stream;
a first rotating shaft rotatably coupled to the nacelle, the first rotating shaft being coupled in a perpendicular direction to a longitudinal direction of the nacelle, wherein the nacelle is configured to rotate about the first rotating shaft by a change in the tidal stream;
a rotor provided at one side of the nacelle with reference to the first rotating shaft, and configured to be rotated by the flowing energy of the tidal stream;
a power transmission shaft within the first rotating shaft, wherein the power transmission shaft is configured to be cooperatively rotated with the rotating shaft of the rotor by a first bevel gear set;
a rudder unit provided at the other side of the nacelle with reference to the first rotating shaft, and including a rudder fixed to the nacelle and a variable rudder rotatably connected to the nacelle; and
a control unit configured to control the rotation of the variable rudder,
wherein, when the flow direction of the tidal stream is changed, the rotation of the variable rudder is controlled by the control unit so that drag and lift are generated on the rudder unit to rotate the nacelle about the first rotating shaft.

2. The yaw control-by-rudder type tidal stream power generation apparatus of claim 1, wherein the variable rudder is connected to the nacelle to be rotatable about a second rotating shaft, and the second rotating shaft is coupled to an actuator unit within the nacelle.

3. The yaw control-by-rudder type tidal stream power generation apparatus of claim 2, wherein the actuator unit includes:

a third rotating shaft configured to be cooperatively rotated with the second rotating shaft by a second bevel gear set; and a motor unit configured to transmit a rotary power to the third rotating shaft, and connected with the control unit.

4. The yaw control-by-rudder type tidal stream power generation apparatus of claim 2, wherein the first rotating shaft and the second rotating shaft are configured to be parallel to each other and extend in opposite directions from the nacelle.

5. The yaw control-by-rudder type tidal stream power generation apparatus of claim 4, wherein the fixed rudder and the variable rudder extend in opposite direction from the nacelle.

6. The yaw control-by-rudder type tidal stream power generation apparatus of claim 4, wherein a pair of fixed rudders are provided to extend from the nacelle within an inclined angle between the first rotating shaft and the second rotating shaft and arranged to be symmetric to each other with reference to the second rotating shaft.

7. The yaw control-by-rudder type tidal stream power generation apparatus of claim 1, further comprising:

a first detection sensor configured to detect a flow direction and speed of the tidal stream;

a second detection sensor configured to detect a rotating angle and speed of the variable rudder; and a third detection sensor configured to detect a rotating angle and speed of the nacelle, wherein the control unit controls the rotation of the variable rudder by receiving a signal from each of the first detection sensor, the second detection sensor, and the third detection sensor.

8. The yaw control-by-rudder type tidal stream power generation apparatus of claim 1, wherein the fixed rudder and the variable rudder are formed in a streamlined shape, and the variable rudder generates drag and lift that reverse the direction of the nacelle in the process where a front end of the variable rudder is rotated toward a coming tidal stream when the flow direction of the tidal stream is reversed and then returns to its original position.

* * * * *